United States Patent
Ben-David et al.

(10) Patent No.: US 12,147,534 B2
(45) Date of Patent: *Nov. 19, 2024

(54) GRAPH-BASED CLASSIFICATION OF ELEMENTS

(71) Applicant: Cybereason Inc., Boston, MA (US)

(72) Inventors: Assaf Ben-David, Tel Aviv (IL); Yonatan Perry, Neve Yarak (IL)

(73) Assignee: Cybereason Inc.

( * ) Notice: Subject to any disclaimer, the term of this patent is extended or adjusted under 35 U.S.C. 154(b) by 874 days.

This patent is subject to a terminal disclaimer.

(21) Appl. No.: 17/223,249

(22) Filed: Apr. 6, 2021

(65) Prior Publication Data

US 2021/0312042 A1 Oct. 7, 2021

Related U.S. Application Data

(63) Continuation-in-part of application No. 17/065,362, filed on Oct. 7, 2020, now Pat. No. 11,777,985.

(60) Provisional application No. 63/005,621, filed on Apr. 6, 2020.

(51) Int. Cl.
*G06F 21/55* (2013.01)
*G06F 16/901* (2019.01)
*G06N 3/04* (2023.01)

(52) U.S. Cl.
CPC ........ *G06F 21/554* (2013.01); *G06F 16/9024* (2019.01); *G06N 3/04* (2013.01)

(58) Field of Classification Search
CPC ...... G06F 21/554; G06F 16/9024; G06N 3/04
See application file for complete search history.

(56) References Cited

U.S. PATENT DOCUMENTS

| 10,009,358 | B1* | 6/2018 | Xie | G06F 21/552 |
| 11,122,063 | B2* | 9/2021 | DiValentin | H04L 63/1416 |
| 2019/0122258 | A1* | 4/2019 | Bramberger | G06N 3/08 |

OTHER PUBLICATIONS

Gallo et al., "Directed Hypergraphs and Applications", Discrete Applied Mathematics, vol. 42, pp. 177-201 (1993).

(Continued)

*Primary Examiner* — Minh Chau Nguyen
(74) *Attorney, Agent, or Firm* — DLA Piper LLP US

(57) ABSTRACT

Systems and methods are provided to determine a maliciousness level of an element using a hypergraph of neighbors. The method can include receiving the element; generating a hypergraph of neighbor target elements found in a database, the hypergraph comprising a set of nodes and a set of edges, wherein the set of nodes represents the neighbor target elements, and the set of edges represents connections between the neighbor target elements; classifying nodes and edges in the hypergraph; generating a maliciousness level profile for the element based on aggregation of nodes and edges in the hypergraph; linking information related to the element with the maliciousness level profile for the element; and performing an action based on a type of the element.

20 Claims, 5 Drawing Sheets

(56) References Cited

OTHER PUBLICATIONS

Hamilton et al., "Inductive Representation Learning on Large Graphs", 31st Conference on Neural Information Processing Systems (NIPS 2017), Long Beach, CA, USA, 19 pages (2017).
Kipf et al., "Semi-Supervised Classification with Graph Convolutional Networks", ICLR 2017, arXiv:1609.02907v3, 13 pages, Nov. 3, 2016.
Schlichtkrull et al., "Modeling Relational Data with Graph Convolutional Networks", arXiv:1703.06103v4, 9 pages, Oct. 16, 2017.

\* cited by examiner

GRAPH-BASED CLASSIFICATION OF ELEMENTS

CROSS REFERENCE TO RELATED APPLICATIONS

This application is a continuation-in-part of co-pending U.S. application Ser. No. 17/065,362, filed on Oct. 7, 2020, which claims priority to U.S. Provisional Application No. 63/005,621, filed Apr. 6, 2020, both of which are herein incorporated by reference in their entireties.

FIELD OF THE INVENTION

Embodiments of the present disclosure relate to cybersecurity and, more particularly, to graph-based systems of element classification using a tool such as VirusTotal.

BACKGROUND OF THE DISCLOSURE

Cybersecurity systems typically manage a wide variety of information types for various types of elements (e.g., files, processes, internet protocol (IP) addresses, etc.). One prominent type of information are reputation indications that have been gathered from external sources. This type of information can be impactful for decision making processes, since external information typically has the potential to give a broader context than what can be observed in the context of some specific detection scenario. As a result, many important techniques for providing security value rely on external reputation, such as detecting malicious elements or identifying properties of observed threats. This property is common to most advanced cybersecurity solutions.

External sources that maintain element reputations are typically vast databases that contain security-related information; one such database is VirusTotal (VT). These resources are constantly being updated by many parties across the globe. In the cybersecurity world, these databases are considered quality sources of security data regarding both malicious and benign samples. For example, VT contains four main kinds of elements: files, domains, IP addresses, and uniform resource locator (URL) web addresses, and the connections between them. In addition, other databases may contain information on additional types of elements, such as processes, storage devices, users, user groups, computers, mobile devices, network equipment, configuration sets, logs, databases, email addresses, email messages, and organizational departments.

However, one major drawback of using external reputation sources is that they require the relevant elements to have been observed beforehand. This is further exacerbated in the common case where the element being analyzed cannot be exported for examination, due to timing constraints, privacy issues or other reasons. In these cases, the element is considered "unknown", which can, in and of itself, be a valid indication, albeit a considerably less useful one than, say, "malicious" or "benign."

SUMMARY OF THE DISCLOSURE

Embodiments of the present disclosure relate to a method of determining a maliciousness level of an element using a hypergraph of neighbors. The method can include scanning a computing device to identify an element with a maliciousness level that is at least partly undetermined; generating, for the identified element, a hypergraph of neighbor target elements found in a data source, the hypergraph comprising a set of nodes and a set of edges, wherein the set of nodes represents the neighbor target elements, and the set of edges represents connections between the neighbor target elements; providing the hypergraph as an input to a classifier; classifying, using the classifier, nodes and edges in the hypergraph; generating a maliciousness level profile for the element based on aggregation of nodes and edges in the hypergraph; and performing an action based on the maliciousness level profile.

In some embodiments, the data source can include an endpoint. In some embodiments, the hypergraph can include a single source node for each of the set of edges. In some embodiments, the hypergraph can include at least one node with one or more edges. In some embodiments, the hypergraph can be a hypergraph comprising combined data collected from the data source and data from one or more external databases. In some embodiments, sets of neighborhoods of target nodes can be generated iteratively based on nodes satisfying particular features.

In some embodiments, generating the hypergraph can include acquiring the neighbor target elements using a crawling procedure. In some embodiments, an element can be classified based on its connections to neighbors without a classification of at least one of the neighbors. In some embodiments, the classifier can include a graph neural network.

In some embodiments, the action can, if the element comprises a file, include at least one of isolating a machine that received the file; killing at least one process started by the file; removing persistence of the file on at least one of a network or affected computer; cleaning at least one infected sample; modifying a risk assessment for at least of the network or affected computer; generating a report; collecting additional artifacts; triggering a search for related elements; blocking a user from taking actions; or sending information to at least one other security system. The action can also include blocking an IP address or a web domain from network access; restricting at least one user authorization; blocking access to an external device; shutting down at least one computer; erasing at least one memory device; or filtering at least one electronic mail message.

According to another aspect of the present disclosure, a method of classifying an element can include generating a hypergraph of nodes, edges, and neighboring elements by crawling; iteratively generating sets of neighborhoods of the element from the hypergraph; determining a maliciousness level for the element by analyzing the sets of neighborhoods with a trained neural network, linking information relating to the element and the maliciousness level profile for the element; and performing an action based on a type of the element. Each layer of the neural network can include aggregating information from immediate neighbors of each node and using the information to calculate additional features for said node; feeding a plurality of features into a neural layer, one for each node kind; and generating a maliciousness level profile for the element.

In some embodiments, the nodes can be typed, and nodes of different types can include different features. In some embodiments, the hypergraph can include a single source node for each edge. In some embodiments, each edge can be mapped to a set of target nodes. In some embodiments, the method can include utilizing an aggregation function, wherein the aggregation function can be configured to determine most extreme evidence from features of the neighbors. In some embodiments, the additional features can be fed into a fully connected neural layer, and then a maximum over all the neighbors is selected. In some embodiments, the neural network can be trained by providing a set of seed nodes; crawling for a set of the seed nodes' neighborhoods; building a subgraph from the set of the seed nodes' neighborhoods; and training the neural network by feeding the subgraph to the neural network.

In some embodiments, the action can, if the element comprises a file, include at least one of isolating a machine that received the file; killing at least one process started by the file; removing persistence of the file on at least one of a network or affected computer; cleaning at least one infected sample; modifying a risk assessment for at least of the network or affected computer; generating a report; collecting additional artifacts; triggering a search for related elements; blocking a user from taking actions; or sending information to at least one other security system. The action can also include blocking an IP address or a web domain from network access; restricting at least one user authorization; blocking access to an external device; shutting down at least one computer; erasing at least one memory device; or filtering at least one electronic mail message.

According to another aspect of the present disclosure, a computing system for determining a maliciousness level of an element can include one or more processors and one or more non-transitory computer-readable media. The media can store a neural network trained to receive a hypergraph as an input; and classify a node of the hypergraph. The media can also store instructions that, when executed by the one or more processors, cause the computing system to perform operations that can include scanning an external computing device to identify elements of an unknown maliciousness level; generating an element hypergraph associated with the unknown element; processing the element hypergraph with the neural network to generate a maliciousness classification; and performing an action based on the maliciousness classification.

In some embodiments, the neural network can be a graph convolutional neural network and comprises one or more layers, each layer comprising an aggregation layer and a fully-connected layer, wherein the fully-connected layer processes the element hypergraph and an output from the aggregation layer.

DESCRIPTION

Figure 1:
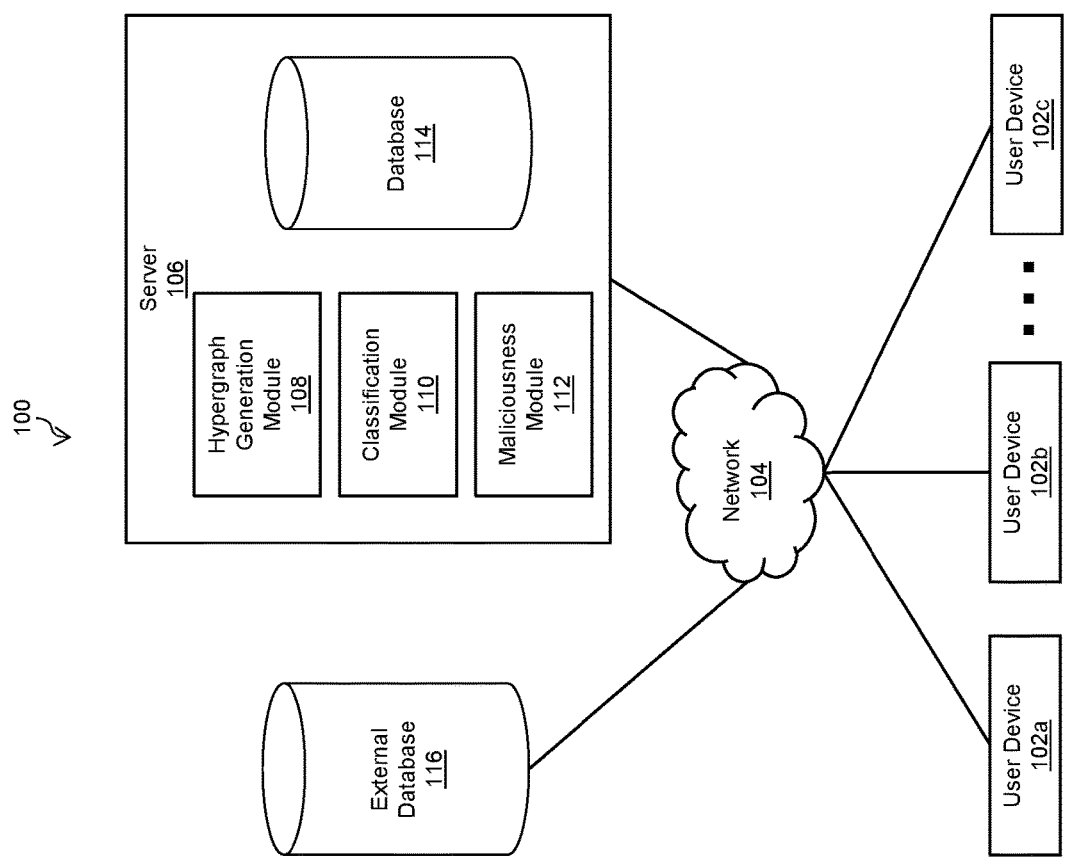
FIG. 1 is a block diagram of an example system for the graph-based classification of elements, according to some embodiments of the present disclosure.

The following detailed description is merely exemplary in nature and is not intended to limit the invention or the applications of its use.

Many cybersecurity platforms collect relevant data from the user's end-point computer and analyze said data on a central server. This analysis can often include queries to VT or other similar databases, such as for the image file of every process it encounters. These queries can let the system know whether the file is already known to the community, and, if so, what the file's reputation is. If the file is unknown to VT, other methods must be utilized in order to assess whether it is malicious. Embodiments of the present disclosure relate to methods for determining whether elements that are unknown in communal databases are malicious. As described herein, a "maliciousness level" can be continuous, discrete, or a combination of both. Examples of maliciousness levels can include whether a file is malicious or benign (binary), the level of trust associated with a web domain, the probability of a machine to be infected by a malicious software, the application type of an executable file, and association between users and the computers they use. VT is used as an exemplary database. The present disclosure is not limited to VT and can be applied to any other similar database known to one of ordinary skill in the art.

When an element is unknown to VT, cybersecurity systems lack direct community reputation for it. However, in certain situations, it may still be possible to obtain indirect information relating to the unknown element from VT and use that information in order to estimate a maliciousness level. This can be done when the platform of the present disclosure detects connections between the element and other elements, i.e., its neighbors. If some of the neighbors are known in VT, systems of the present disclosure can use their VT records to indirectly classify the element itself.

As described above, one such external database (VT) may include four element types, although other databases may contain other elements types, and each element has various fields from which features can be extracted. In addition, elements can be connected to other elements. The four VT element types may include files, domains, IP addresses, and URL web addresses.

Files can contain both static information on the file itself and dynamic information describing the behavior of processes running when the file is invoked. Static data can include, for example, information such as file size, file type, signature information and entropy, and the like. Dynamic data can include connections to other elements (e.g. resolved domains, TCP/UDP connections and execution parents). File element types can also contain the scan results of the various anti-virus engines incorporated into VT.

Domains can contain, for example, the WHOIS report, as well as information aggregated from other services such as Alexa™ or Web of Trust™. The domain elements can also contain connections to other elements (e.g. in the forms of domain siblings, subdomains, IP resolutions, communicating files and URLs).

IP address elements can contain, in addition to information such as autonomous system numbers and registration countries, connections to other elements via domain resolutions, communicating files, and URLs, among others.

URL web addresses, like file elements, can contain the scan results of various external engines. In addition, several external services provide categorization of the URL content. Examples of connections to other elements can be the IP resolutions and the domain hosting the page.

These elements connect with each other via several types of relations. Each element kind has its own possible relations to other kinds. In addition, there are examples where a pair of element kinds has several different relations connecting between them. As detailed below, such complex relations can be best represented using an extension of a graph.

Similar to the above-mentioned database of elements, cybersecurity platforms typically utilize sensors to collect system-level data that is useful in the detection of a cyberattack. Types of collected data can include, for example, process information (e.g., process type, process name, parent/child processes, memory usage, session ID, network connections, owner name, privileges, security context, and start/end times), file information (e.g., information related to the file's full path, file attributes, file size, creation and modification dates, versions, reputation information, and file hash), and connections information (e.g., local IP address and port, remote IP address and port, transport protocol, transmitted or received bytes, and start/end times).

The elements typically collected and maintained by cybersecurity platforms are similar to the elements maintained in community reputation databases, suggesting they can also be represented by an extension of a graph.

Accordingly, this can enable translation of cybersecurity platform representations to that of databases such as VT. Each process has features of its own and features describing the file associated with it. In addition, using the information collected on the connections opened by the process, the described systems and methods can connect neighbors to each process (e.g., resolved domains, IP connections using TCP or UDP, or even the execution parent file), in much the same way as in VT.

Within this context, two important aspects of graph-based inference may be considered. First, graph relations are inherently unordered (e.g., the resolved IP addresses of a domain may not have intrinsic ordering). This proves to be a challenge for most algorithms, especially algorithms based on neural networks, which typically require a clear and structured order for processing input. Second, propagating information along a graph involves making iterative inferences about intermediate elements. This, however, has an inherent significant drawback: since the structure of the graph can be quite complex, any single element can participate in the inference of more than a single target element. Moreover, when used for classification of different target elements, each intermediate element can play a different role or appear in a different context. Committing to a class for each intermediate element then using that same class for classification in different contexts can cause errors, which then propagate as the network is traversed. This is especially important for cyber-security purposes, where an element is often not inherently "good" or "bad", but instead should be considered in the context of a bigger picture.

For example, consider a case of two file elements undergoing classification and a certain web domain. One file was downloaded from the domain, while the other was observed communicating with it. The same domain element therefore serves in a different role relative to each file element. Similarly, an element can be a close neighbor to one target element and a far neighbor to another, can have few or many graph paths leading to the target element, etc.

One way to mitigate such problems is to classify a single element at a time while reclassifying intermediate elements each time, in each context. This, however, is not very efficient and does not take full advantage of the complexity of a true graph structure. A more efficient approach is to avoid classifying intermediate elements altogether and instead use them in a flexible manner which is context-aware. This allows the classification of several elements simultaneously—a much more versatile and efficient approach—while also avoiding the introduction of errors such "hard" intermediate classifications can cause. Accordingly, embodiments of the present disclosure provide an effective cybersecurity graph-based learning system.

Embodiments of the present disclosure can use a directed hypergraph to classify an element based on information aggregated from its close neighbors in the graph. A crawling procedure can be used, starting from elements needing classification and collecting a set of their neighbors to form a neighborhood. An example use of the disclosed principles in a cybersecurity platform is when the system encounters an element known or unknown to VT or other databases, and also detects connections from it to other elements which are found in VT. These neighbors are then used to classify the element. This classifier is able to obtain an entire neighborhood as an input, rather than a feature vector. A neighborhood input is much richer than feature vector approaches. Here, the input includes several feature vectors, one for each element in the neighborhood. In addition, a mapping of interconnections can be provided for each group of elements.

In some embodiments, network (graph) analysis may be used to determine the maliciousness level of elements for the purpose of cybersecurity.

In some embodiments, observed properties of elements may be used to indirectly deduce information about them from a cybersecurity database (such as VT), even when the element in question is not present in the database.

In some embodiments, incrimination of an element based on its connections to neighbors without a classification of these neighbors may be provided.

As described above, both external databases and the cybersecurity platforms contain information regarding the same kinds of elements that have the same connections (albeit maybe having different features). A useful way of representing these elements is with a directed graph. However, in our case an element can connect to multiple neighbors using the same connection. Therefore, a more suitable structure in this case can be, in fact, a directed hypergraph.

As described herein, a directed hypergraph can also be generalized to include a directed multidigraph, or a quiver. A directed multi-hypergraph can be defined as an ordered tuple $G=(V, \varepsilon, s, t, w)$, where $V$ is a set of vertices (or nodes, or elements) and $\varepsilon$ is a set of directed hyperedges (or simply edges). The function $s: \varepsilon \rightarrow V$ assigns to each edge a source node, and the function $t: \varepsilon \rightarrow 2^V \setminus \{\emptyset\}$ assigns to each edge a set of target nodes, where $\emptyset$ is the empty set; $w$ is a family of weight functions, providing each edge $e \in \varepsilon$ with a weight function $w_e: t(e) = \mathbb{R}_{>0}$, where $\mathbb{R}_{>0}$ is the set of positive real numbers.

In some embodiments, there may be a restriction to allow only a single source node for each edge (what is called a forward hypergraph or an F-graph, as described in "Directed Hypergraphs and Applications" by G. Gallo et al. (1993), which is herein incorporated by reference in its entirety). A more general hypergraph allowing multiple source nodes can be represented using this scheme by, for example, replicating each edge according to the number of its sources and assigning each copy to a different source, with the same set of targets. In some embodiments, when $|t(e)|=1$ for every $e \in \varepsilon$, the directed multi-hypergraph reduces to a standard (weighted) quiver. In some embodiments, an element can possibly be connected to itself (e.g., $s(e) \in t(e)$). In some embodiments, the weights $w$ can be included for the sake of generality; for example, in the application of VT file classification, they may not be required and $w_e(v)=1$ can be set for every $e \in \varepsilon$ and $v \in t(e)$. In some embodiments, this framework can be used to represent an undirected hypergraph. To do so, for every edge $e \in \varepsilon$, all $|t(e)|$ reverse edges e' can be included in $\varepsilon$ each satisfying $s(e') \in t(e)$ and $t(e')=\{s(e)\}$.

In addition to having the structure of a directed hypergraph, the data can also be typed and relational, meaning there are different node types (or kinds), each having different features, and relations specifying the allowed connections between them (e.g. hostname is a relation connecting URL elements to Domain elements). To formalize this notion, a typing structure can be added to the graph definition. A typed and relational version of the hypergraph G can be defined as the ordered pair $\mathcal{G} = (G, M)$. The typing structure $M=(\mathcal{K},, \mathcal{R},, \kappa_s, \kappa_t)$ can be a quiver, which we call the meta-graph of G. Its node and edge sets, $\mathcal{K}$ and $\mathcal{R},$, are partitions of V and E, respectively, representing the different node kinds and relations. Similar to s and t, the functions $\kappa_{s,t}: \mathcal{R} \to \mathcal{K}$ can assign to each relation its source and target node kinds, respectively. In order for these definitions to be meaningful, consistency constraints can be imposed and, for every relation $r \in \mathcal{R}$ and every edge $e \in r$, it can be required that $s(e) \in \kappa_s(r)$ and $t(e) \subseteq \kappa_t(r)$. As discussed above, if the hypergraph is undirected, for every relation $r \in \mathcal{R},$, its reverse relation r' satisfying $\kappa_s(r')=\kappa_t(r)$ and $\kappa_t(r')=\kappa_s(r)$ must be included in $\mathcal{R}.$.

A meta-graph can be used to declutter the graph somewhat by unifying edges of the same relation having the same source node. Since the hypergraph allows for several target nodes for each edge, there is no benefit in maintaining several edges having the same "role" (i.e., belonging to the same relation). Formally, for every $r \in \mathcal{R}$ and $v \in \kappa_s(r)$ the plurality set can be defined as $P_r(v)=\{e \in r | s(e)=v\}$. If $|P_r(v)| > 1$, the edges in $P_r(v)$ can be removed from $\varepsilon$ and replaced with a single edge $\bar{e}$ satisfying: 1) $s(\bar{e})=v$; 2) $t(\bar{e})=U_{e \in P_r(v)} t(e)$; and 3)

$$w_{\bar{e}}(u) = \sum_{\substack{e \in P_r(v) \\ u \in t(e)}} w_e$$

(u) for every $u \in t(\bar{e})$. In addition, the unified edge $\bar{e}$ can be included in the relation r.

As described herein, because a goal of the present disclosure is to classify an element based on information aggregated from its close neighbors in a graph, "close neighbors" can be defined using the following:

$F_*(v)=\{e \in \varepsilon | s(e)=v\}$, $\tilde{F}_*(k)=\{r \varepsilon \mathcal{R} | \kappa_s(r)=k\}$, where $F_*$ is called the forward star of a node $v \in V$ and $\tilde{F}_*$ the relational forward start of a node kind $k \in \mathcal{K}.$. From here, the neighborhood of a node can be defined as: $N(v)=U_{e \in F_*(v)} t(e)$. This allows for the definition of a series:

$$N_0(v) = \{v\},$$
$$N_\ell(v) = \bigcup_{u \in N_{\ell-1}(v)} N(u) \quad (\ell > 0),$$

where each $\mathcal{N}_\ell(v)$, called the set of $\ell$-neighbors of node v, can reach further along the graph than its predecessor. $\mathcal{N}_\ell(v)$, called the $\ell$-neighborhood of node v, can be defined as $\mathcal{N}_\ell(v) = U_{i=0}^\ell N_i(v)$.

For an integer parameter L>0, the furthest neighbor participating in the prediction for each element can be determined; this parameter can correspond to the number of layers used in the neural network classifier. Given L, a neighborhood can be determined for each element to be classified. Each $\ell$-neighborhood can be acquired using a crawling procedure. For example, starting from the elements to be classified (called seeds), the $\ell$-neighbors can be collected sequentially; for each seed v, $N_0(v)$ (a first neighborhood) can be constructed, followed by an additional neighborhood for each $\ell = 1, \ldots, L$.

In some embodiments, it can be beneficial to limit the size of the neighborhoods due to performance considerations. This can be achieved by, for example, uniformly sampling the target nodes of each edge when crawling the graph. To do so, a size limit $S_{max}$ can be set (e.g., 20) and, whenever the neighborhood equation is used, a uniform sample (without replacement) of only $S_{max}$ nodes from t(e) can be used for every edge e satisfying $|t(e)| > S_{max}$.

One example use of this classifier in a cybersecurity platform is in cases in which the system encounters a file unknown to an external database, but also detects connections from it to other elements which are found in the database. These neighbors are then used to classify the unknown file. This means that, in this example, two different kinds of file elements are found in the graph: files found in the database (encountered as neighbors) and unknown files (encountered only in the platform) acting as seeds requiring classification. The former node kind can be referred to as a File and the latter can be referred to as a FileSeed. As FileSeeds are unknown, their features are a small subset of File features. This means that, by removing some features from File elements, mock FileSeed elements can be generated from the Files and used for training a neural network.

Therefore, crawling procedures can be applied to acquire data, either for training a neural network classifier or during production. During training, after deciding on a set of files suitable for training that will act as seeds, all known to an external database, crawling can be performed for their L-neighborhoods and the original seed elements can be converted to FileSeeds. During production time, there are FileSeeds encountered by a security platform, unknown to VT, and one or more neighbors of each. Then, crawling only needs to be performed for the (L−1)-neighborhood of each neighbor to acquire all the necessary data.

When training the neural network classifier as described herein, labels can be used for the seed elements. Since, in these embodiments, at training time the seeds are made from complete File elements known to VT, all the available information can be used to produce the labels. This can be done either manually by domain experts, or automatically using some logic operating on each VT File report. For example, the classification can be done based on two classes ('malicious' or 'benign'); however, the method described below is generic and works for multi-class classification, as well.

Additionally, while classification of unknown files is the main example described herein, the disclosed principles can be used to classify other element kinds as well, even simultaneously with File elements. Seeds of several node kinds can be used with no alteration to the formalism.

Once, for each seed, the crawling for its neighbors necessary for classification is performed, the classifier then has to be able to receive an entire neighborhood as an input (i.e., the subgraph induced by $\mathcal{N}_L(v)$). This type of input is much richer than the traditional "feature vector" approach. The neighborhood includes several feature vectors, one for each element in the neighborhood. The number of neighbors is not constant between samples, and they can be of different kinds (each element kind has its own set of features). In order to provide a mapping of the connections (i.e., which element is related to which), the architecture suited for this task is the Graph Convolution Network.

A graph convolution network (GCN) can be beneficial for the embodiments described herein as it operates by accepting subgraphs as inputs. While other methods require an entire graph in order to produce classification to some of its nodes, using a GCN can assist in learning a set of weights used to aggregate information from neighborhoods. The same weights can then be used for new neighborhoods to classify new, yet unseen elements. In some embodiments, the disclosed architecture can be based on the GraphSAGE algorithm. However, the disclosed principles are not limited to this architecture and many approaches can be combined to utilize the disclosed typed and relational graphs, such as those described in "Modeling Relational Data with Graph Convolutional Networks" by M. Schlichtkrull et al. (2017), which is herein incorporated by reference in its entirety.

The disclosed typed graph of elements in which different node kinds have different features can be represented as follows: for each $k \in \mathcal{K}$, indices can be arbitrarily assigned to its elements as $k=\{v_1^k, \ldots, v_{|k|}^k\}$. A feature matrix $X_k$ of dimensions $|k| \times f_x$, where $f_x$ is the number of features of kind k, is built; in this matrix, row i holds the features of $v_i^k$.

In order to represent the connections between elements, an adjacency matrix $A_r$ of dimensions $|\kappa_s(r)| \times |\kappa_t(r)|$ is built for each relation $r \in \mathcal{R}$. The adjacency matrix can be a sparse matrix in which the entry in row i and column j is non-zero if there is an edge $e \in r$ such that $v_i^{\kappa_s(r)}=s(e)$ and $v_j^{\kappa_t(r)} \in t(e)$, in which case $(A_r)_{ij}=w_e(v_j^{\kappa_t(r)})$.

Thus, with the $|\mathcal{K}|$ features matrices $\{X_k\}$ and $|\mathcal{R}|$ adjacency matrices $\{A_r\}$, the graph can be represented. During training, the elements in the graph which function as seeds (e.g., the elements actually in need of classification) have labels, and at inference time, those elements are those that are classified. As discussed above, several of the elements can function as seeds. There can even be seeds of several different node kinds.

Much like a conventional neural network, a GCN is constructed in successive layers. Having chosen L and collected $\mathcal{N}_L(v)$ for each seed, L layers are utilized in the GCN. As discussed above, this includes the furthermost neighbors that participate in the prediction for each seed. For example, if L=2, each seed receives information from, at most, its neighbors' neighbors.

Each layer of the GCN can include two processing steps: 1) aggregate information from the immediate neighbors of each node and use them to calculate additional features for it; and 2) feed all features (both original and aggregated from neighbors) into a fully-connected neural layer, one for each node kind. In this way, at each iteration (layer), information can flow along the edges of the graph a distance of one edge and in the direction opposite to that of the edge.

In some embodiments, each element's own features are used when calculating its activations for the next layer. Therefore, elements are not explicitly considered their own neighbors; this can prevent extra, unfair weights given to their features. To avoid this, for each relation r connecting a node kind to itself (i.e., $\kappa_s(r)=\kappa_t(r)$), the diagonal of the corresponding adjacency matrix can be set to zero.

In some embodiments, the activation matrix for a node kind k in layer $\ell$ can be denoted by $Z_k^{(l)}$. The dimensions of the activation matrix can be $|k| \times f_k^{(l)}$, where $f_k^{(l)}$ can be the chosen number of units for the node kind in this layer. Initial settings can be $Z_k^{(0)}=X_k$ and $f_k^{(0)}=f_k$ for each $k \in \mathcal{K}$. The final number of units, $f_k^{(l)}$, can be the number of output classes if there are seeds of the same node kind. Otherwise, $Z_k^{(l)}$ may not be calculated.

In some embodiments, for each layer $\ell$ and each relation $r \in \mathcal{R}$, an aggregation function can be chosen, $AGG_r^{(l)}$. This function can take the features of the target nodes (e.g., the neighbors) of relation r and aggregate them together for each source node, according to the adjacency matrix. The result can be a feature matrix for neighbors $N_r^{(l)}=AGG_r^{(l)}(Z_{\kappa_t(r)}^{(l)}, A_r)$, where a row i holds the aggregated features from the neighborhood of $v_i^{\kappa_s(r)}$. Its dimensions can be $|\kappa_s(r)| \times n_r^{(l)}$, where $n_r^{(l)}$ is the number of resulting aggregated features.

The original features, in addition to the aggregated features, can be fed into a fully connected neural layer. For each node kind k, a kernel matrix $W_k^{(l)}$ with dimensions $f_k^{(l)} \times f_k^{(l+1)}$ and a bias vector $b_k^{(l)}$ of length $f_k^{(l+1)}$ can be defined. In addition, for each relation r, a kernel matrix $\tilde{W}_r^{(l)}$ of dimension $n_r^{(l)} \times f_k^{(l+1)}$ can also be defined. Then, the layer's output can be calculated as $Z_k^{(l+1)}=\sigma(Z_k^{(l)} W_k^{(l)} + \Sigma_{r \in \tilde{\mathcal{R}}_*(k)} N_r^{(l)} \tilde{W}_r^{(l)} + b_k^{(l)})$, where $\sigma$ is an activation function. Within the present disclosure, various activation functions can be used, such as softmax (which operates on vectors or rows of a matrix and can be defined as softmax$(x)_i=e^{x_i}/Z(x)$ where $Z(x)=\Sigma_j e^{x_j}$) for the last layer and a rectified linear unit function (e.g., ReLU where ReLU$(x)=\max(x,0)$) for all other layer. From the output matrices $\{Z_k^{(L)}\}$, the rows corresponding to the seeds can be taken as the output of the neural network. In some embodiments, because node kinds that do not have seeds are only used as neighbors, the calculation of the final $Z_k^{(L)}$ for those kinds can be skipped.

As discussed in "Inductive Representation Learning on Large Graphs" by W. L. Hamilton et al. (2017), which is herein incorporated by reference in its entirety, any function $AGG_r^{(l)}$ used to aggregate neighbors' features can, when viewed as operating on the neighbors of a single node, have the following properties: variadic (e.g., the function can operate on any number of neighbors), order agnostic (e.g., invariant to permutations of the inputs), trainable (e.g., the weights for the function can be trained), and expressive (e.g., the function has high representational capacity and aggregates the neighbors' feature in a meaningful way). The first two properties imply that the function operates on a set. In general, any function with these properties can serve as an aggregation function. However, in some embodiments, aggregation functions that maintain simplicity (e.g., fewer weights to train) but are more expressive may be preferred.

In some embodiments, a mean aggregation function can be used, which has no trainable weights. The function calculates the weighted mean of each feature over all neighbors. As such, the number of features remains unchanged (e.g., $n_r^{(l)}=f_{\kappa_t(r)}^{(l)}$). In some embodiments, the adjacency matrix $A_r$ can be used to build its out-degree matrix $\dot{D}_r$, a diagonal matrix of dimensions $|\kappa_s(r)| \times |\kappa_s(r)|$ that satisfied $(\dot{D}_r)_{ij}=\delta_{ij} \Sigma_k (A_r)_{ik}$, where $\delta_{ij}$ is the Kronecker delta. The aggregated feature matrix is then given by $N_r^{(l)}=\dot{D}_r^{-1} A_r Z_{\kappa_t(r)}^{(l)}$. In some embodiments, for efficiency purposes, the matrix $\dot{D}_r^{-1} A_r$ may only be calculated once, in advance.

In addition, other normalizations can be utilized within the disclosed principles. For example, motivated by the symmetric normalized Laplacian operation, a variation of mean aggregation can be considered, such as described in "Semi-Supervised Classification with Graph Convolutional Networks" by T. N. Kipf et al. (2016), which is herein incorporated by reference in its entirety. With this, the in-degree matrix $\ddot{D}_r$, which satisfies $(\ddot{D}_r)_{ij}=\delta_{ij} \Sigma_k (A_r)_{kj}$, can also be utilized and the aggregated feature matrix is calculated as $N_r^{(l)}=\dot{D}_r^{-1/2} A_r \ddot{D}_r^{-1/2} Z_{\kappa_t(r)}^{(l)}$.

An advantage of the mean aggregator is its simplicity (e.g., there are no weights to train). However, it is also not the most expressive. For each feature, neighbors contribute according to their edge weights. Many neighbors must exhibit extreme values before the effect is evident in the aggregated feature.

In some embodiments, a max pool aggregation function may be used, which is more sophisticated. In some embodiments, max pooling can pick out the most extreme evidence from all features, over all neighbors. The neighbors' features can be fed into a fully connected neural layer, which may change the number of features in the process. For each output feature, the maximum over all neighbors can then be selected. In a general form of this aggregator, a pooling dimension $p_r^{(l)}$ can be selected for each relation r and a pooling kernel matrix $\hat{W}_r^{(l)}$ of dimensions $f_{\kappa_l(r)}^{(l)} \times p_r^{(l)}$ and a pooling bias vector $\hat{b}_r^{(l)}$ of length $p_r^{(l)}$ can be defined. Both of these can be trained with the rest of the neural network weights. The aggregated feature matrix is then given by $N_r^{(l)} = A_r \odot \sigma(Z_{\kappa_l(r)}^{(l)} \hat{W}_r^{(l)} + \hat{b}_r^{(l)})$, where σ is an activation function (e.g., ReLU) and the operator ⊙ is defined as $(A \odot B)_{ij} \equiv$ $$(A \odot B)_{ij} \equiv \max_k \{A_{ik} B_{kj}\}.$$

$\{A_{ik} B_{kj}\}$. This operator is similar to a k standard dot product, but one that takes the maximum instead of summing. The resulting number of aggregated features is then $n_r^{(l)} = p_r^{(l)}$.

In some embodiments, it may be preferable to share the pooling weights between relations having the same target node kind. The motivation for sharing weights is to reduce the complexity of the aggregator, and thus reduce overfitting. Moreover, it makes sense that the means to aggregate features of a certain kind should not depend strongly on the use of these aggregated features later on. In fact, this argument can be applied to any aggregation function which uses trained weights. While the general formalism allows for different weights for each relation, it is often advantageous to share weights in this manner.

In the version of max pooling that incorporates shared weights, a pooling dimension $p_k^{(l)}$, a kernel matrix $\hat{W}_k^{(l)}$, and a bias vector $\hat{b}_k^{(l)}$ is defined for each $k \in \mathcal{K}$. The aggregated matrix would then be $N_r^{(l)} = A_r \odot \sigma(Z_{\kappa_l(r)}^{(l)} \hat{W}_{\kappa_l(r)}^{(l)} + \hat{b}_{\kappa_l(r)}^{(l)})$, where the number of aggregated features is $n_r^{(l)} = p_{\kappa_l(r)}^{(l)}$.

In some embodiments, the max pooling aggregator is not as simple as the mean aggregator and contains trainable weights. However, it is much more expressive. It is designed to be sensitive to extreme neighbors by taking the maximum over them. The fully connected neural layer also allows for great flexibility, as combinations of features can also be considered, different features can be given different relative weights and, by flipping the signs, the maximum function can effectively be changed to a minimum. However, other, more complicated functions may also be used.

Once a label is provided for each seed, the GCN can be trained using standard stochastic gradient descent methods. Any standard loss function can be used (e.g., categorical cross-entropy); common practices like dropout and regularization can also be utilized.

Embodiments of the present disclosure advantageously enable mini-batch training without the need for any special adaptation. After selecting a mini-batch of seeds $B \subset \mathcal{V}$ for training, their L-neighborhoods can be achieved via crawling, $\widetilde{\mathcal{N}}_L(B) = \cup_{v \in B} \mathcal{N}_L(v)$. The subgraph induced by $\widetilde{\mathcal{N}}_L(B)$ can also be built. This can include selecting only the rows of the feature matrices $\{X_k\}$ and the rows and columns of the adjacency matrices $\{A_r\}$ corresponding to nodes in $\widetilde{\mathcal{N}}_L(B)$. These reduced matrices are then fed into the neural network in the same manner as described above.

In some embodiments, the outputs of the GCN are the matrices $Z_k^{(L)}$, one for each kind k which has seed elements. In some embodiments, the GCN is used to classify file elements, so the output is the matrix corresponding to the file kind. Furthermore, only the rows corresponding to the seed elements that require classification are taken. The number of columns, $f_k^{(L)}$, can be the number of possible output classes of the classifier. If a trait to be inferred is continuous, it is represented by a single "class". If discrete, the simplest case is of a binary classifier, having two output classes (e.g., benign and malicious).

In the case of a continuous regressor, depending on the choice of activation function, the output value of the GCN can be the inferred maliciousness level. In the case of a discrete classifier, assuming the activation function used for the last layer was a softmax function, the values in each row are non-negative, and their sum is 1. Therefore, the numbers can be interpreted as probabilities of the sample belonging to the various classes. The network can be trained to provide this meaning to the values, e.g., the labels are encoded prior to training using "one-hot" encoding. In other words, the class $C_m$ can be encoded as the vector $x_i = \delta_{im}$ assigning 100% probability to the class $C_m$ and zero probability to others.

In some embodiments, having the class probabilities for the newly classified samples, the class with the highest probability can be chosen for each sample. Alternatively, a more sophisticated scheme can be implemented, in which a threshold of minimal probability for a class is applied. This class would be chosen if its probability is above the threshold. In this case, a default class must also be assigned and reported in case the probability for no other class is above the threshold. These thresholds can be calibrated on a test set (e.g., by requiring a certain value of precision, recall, or some other metric).

In any case, once a class has been determined for a sample, its probability can be considered the class "score", or confidence level, and reported along with the chosen class. Any system using the results of the classifier can then use this reported level to determine the severity of the classification. For example, in a binary file classifier capable of reporting either malicious or benign for each file, this score (i.e., probability) can determine whether an alert is raised, some automatic remediation performed, or some other action taken.

The graph-based classifier described herein provides an additional, novel source of external reputation for various elements. For example, in the important case of files, it allows the classification of unknown files (i.e., never before seen in an external source such as VirusTotal), for which relations have been observed in a security platform to other elements which are known to the external source. Using this new classifier, indirect reputation for these files can be obtained in the form of the output of the classifier— effectively making many "unknown" cases into "known" cases. This reputation can include a classification such as "malicious" or "benign," an indication of the kind of threat, and so on, together with a confidence score that can further be used to make higher-level security decisions. This indirect reputation is now added as metadata to the element, in a similar way as is done with direct sources of external reputation for "known" elements. Notably, the classifier can provide reputation for elements for which security systems otherwise would not have any.

In some embodiments, the training may be done via loopy belief propagation or other methods which allow training multiple elements simultaneously.

Furthermore, the same process can be used even on known elements, to provide an additional level of external information, one that combines the externally observed reputation of individual elements with their locally observed relations. An example would be an element whose external reputation provides only a marginal indication of maliciousness, not enough to convict it as a threat. However, observing it communicate with another element with marginal reputation, the graph classifier can potentially provide an aggregated, indirect indication of maliciousness which is now enough to convict the sample.

Finally, the reputation indications provided by the graph-based classifier can join all other collected data in the decision-making process constantly taking place within a cybersecurity platform. More specifically, based on the result, alerts can be raised, customers notified, or any other action taken. Consequently, this novel classifier enriches any cybersecurity platform and significantly expands its capabilities in handling different kinds of cybersecurity scenarios.

Thus, a cybersecurity platform utilizing the disclosed principles, can act as a profiler by determining a maliciousness level profile for the element based on aggregation of nodes and edges in the hypergraph. The platform then links information generated relating to the element and the maliciousness level profile for the element to various databases, including VT, and to the network. For example, for an incriminated file, one or more actions can be taken, such as isolating a machine that received the file, killing processes started by the file, removing persistence of the file on the network or affected computer, cleaning infected samples, modifying risk assessment for computer or network, generating a report, collecting additional artifacts, triggering a search for related elements, blocking a user from taking actions and sending information to other IT or security systems. For other element types, some of the above actions are applicable, as well. In addition, there are also other actions specific to particular element types, such as blocking an IP address or a web domain from network access, restricting user authorization, blocking access to an external device, shutting down computers, erasing memory devices, filtering e-mail messages, and many more.

FIG. 1 is a block diagram of an example system 100 for the graph-based classification of elements, according to some embodiments of the present disclosure. The system 100 can include a plurality of user devices 102a-c (generally referred to herein as a "user device 102" or collectively referred to herein as "user devices 102") and a server 106, which are communicably coupled via a network 104. Components of the system 100 can also communicate with one or more external databases 116 via the network 104. In some embodiments, external database 116 can be VirusTotal or some other externally maintained (and potentially communal) database. In some embodiments, server 106 is configured to receive elements (e.g., via scanning) elements from one or more user devices 102.

A user device 102 can include one or more computing devices capable of receiving user input, transmitting and/or receiving data via the network 104, and or communicating with the server 106. In some embodiments, a user device 102 can be representative of a computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the user device 500 described below with respect to FIG. 5. In some embodiments, the system 100 can include any number of user devices 102.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 400 described below in the context of FIG. 4.

As shown in FIG. 1, the server 106 includes a hypergraph generation module 108, a classification module 110, a maliciousness module 112, and a local database 114, although the server 106 can also access the one or more external databases 116. As described above, the server 106 is configured to scan and receive a variety of elements or information on the variety elements from the user devices 102; elements can include files, processes, IP addresses, URL addresses, web domains, storage devices, users, user groups, computers, mobile devices, network equipment, configuration sets, logs, databases, email addresses, email messages, and organizational departments. In some embodiments, the hypergraph module 108 can be configured to, after an element is obtained by the server 106, generate a directed (or undirected) graph or directed hypergraph (i.e., a quiver) associated with the element. The hypergraphs generated by the hypergraph module 108 can include a set of nodes (e.g., elements), a set of edges, a function that assigns each edge a source node, and a function that assigns each edge a set of target nodes. In some embodiments, the hypergraph can be a forward hypergraph, although this is not required. The hypergraph module 108 can also be configured to aggregate data associated with an element and generate a neighborhood for a node/element. In some embodiments, the hypergraph module 108 can employ a crawling procedure to obtain the neighborhood. For example, when an unknown element is received by server 106 from a user device 102 that needs to be classified, the hypergraph module 108 can detect connections to the element from the external database 116 to generate the neighborhood and thus the associated hypergraph.

Classification module 110 can be configured to receive a hypergraph from hypergraph generation module 110 as an input and classify the original element obtained by the server 106. In some embodiments, the classification module 110 can employ a graph neural network to analyze the hypergraph and make a classification (e.g., a prediction on the level of maliciousness of the element). In some embodiments, the classification can be binary (e.g., malicious vs. benign) or can also include a confidence score or probability of the classification. Additional details of the graph neural network are described with respect to FIG. 2 below.

The maliciousness module 112 can be configured to generate a maliciousness profile for the element and link information associated with the element for storage in the local database 114. In some embodiments, the maliciousness module 112 can be configured to, based on the probability or confidence score output by the classification module 110, determine an appropriate action to take. Actions can include isolating a machine that received the file, killing processes started by the file, removing persistence of the file on the network or affected computer, cleaning infected samples, modifying risk assessment for computer or network, generating a report, collecting additional artifacts, triggering a search for related elements, blocking a user from taking actions and sending information to other IT or security systems. For other element types, some of the above actions are applicable, as well. In addition, there are also other actions specific to particular element types, such as blocking an IP address or a web domain from network access, restricting user authorization, blocking access to an external device, shutting down computers, erasing memory devices, filtering e-mail messages, and many more.

An external database 116 can include information on element types such as files, domains, IP addresses, and URL addresses, as well as information on connections between the various types of elements. Local database 114 can include similar information, such as information on different processes, files, and connections.

The various system components—such as modules 108-112—may be implemented using hardware and/or software configured to perform and execute the processes, steps, or other functionality described in conjunction therewith.

Figure 2:
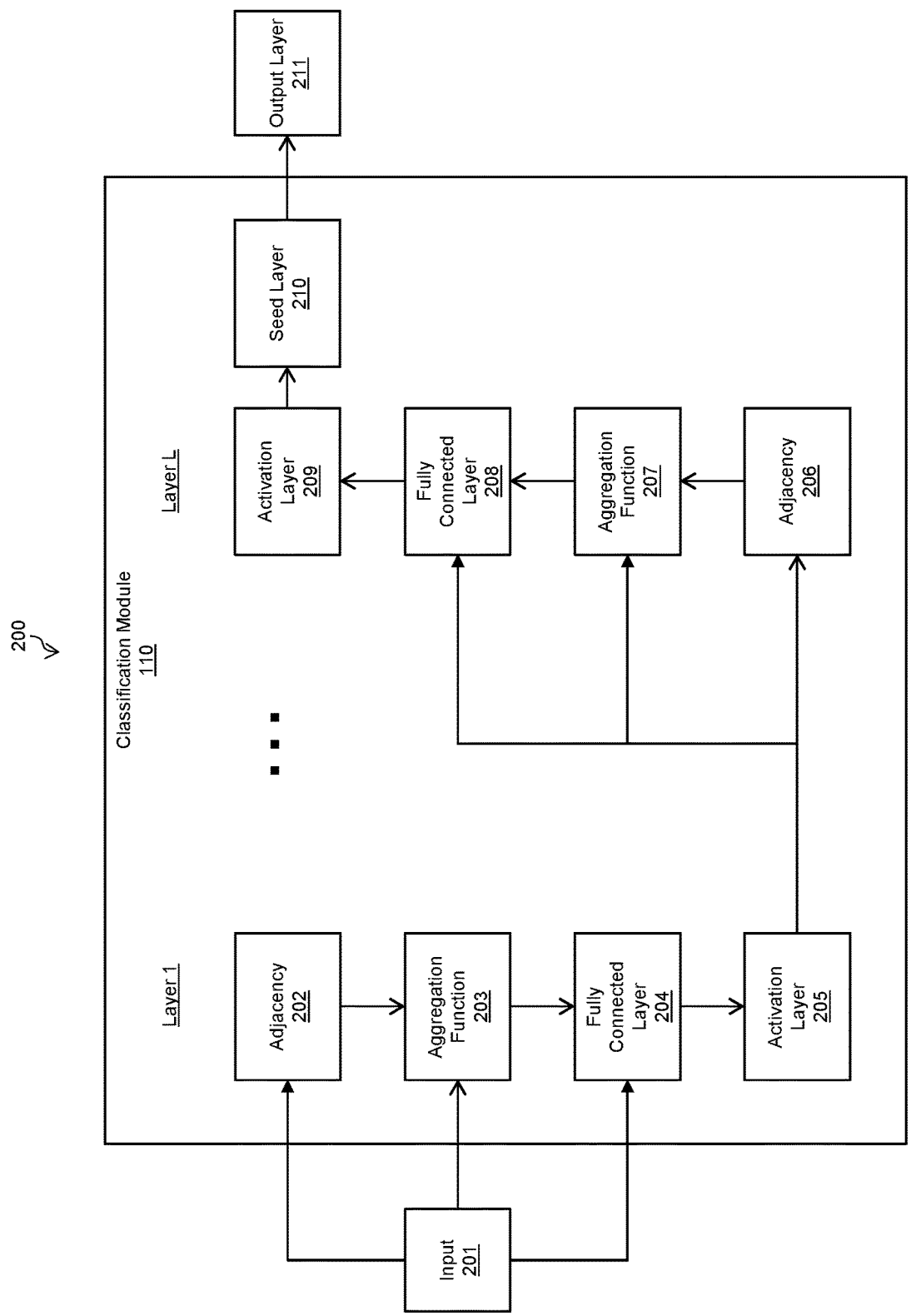
FIG. 2 is an example architecture for a graph neural network, according to some embodiments of the present disclosure.

FIG. 2 is an example architecture 200 for a graph neural network, according to some embodiments of the present disclosure. The architecture can include one or more layers (e.g., L layers, as shown in FIG. 2) and, in some embodiments, the number of layers can correspond to the number or distance from the element for classification that the furthest neighbor is. The input at block 201 can be a hypergraph generated by hypergraph module 108 and can be in the form of a matrix. The input is passed to layer 1, which includes block 202, where an adjacency matrix is generated based on the input. The adjacency matrix and the input matrix are fed to an aggregation function at block 203 to generate a feature matrix, then the feature matrix from the aggregation function block 203 and the input are fed into a fully connected neural layer at block 204. In some embodiments, the aggregation function can include a mean aggregation layer or a max pooling layer. The final step of the layer is an activation layer 205, which can include a rectified linear unit (ReLU) function.

The output of the activation layer can then be fed as an input to a subsequent layer. For example, the activation layer can be fed to block 206, in which another adjacency matrix is generated. This adjacency matrix and the result of the activation layer are fed as inputs to another aggregation function 207 to generate another feature matrix. The feature matrix and the output from the activation layer at block 205 are fed as inputs to another fully connected layer 208, and the resulting output is fed into an activation layer 209. In some embodiments, the activation layer of the final layer in the architecture 200 can be a softmax layer. The output of the final activation layer is fed into a seed layer 210, which can extract only the rows corresponding to the seeds (e.g., the original elements that are desired to be classified). From here, the output layer 211 can provide various probabilities and classifications as discussed herein. It is important to note that the architecture 200 of FIG. 2 is merely exemplary in nature and is not limiting of the makeup of a neural network architecture as used herein.

Figure 3:
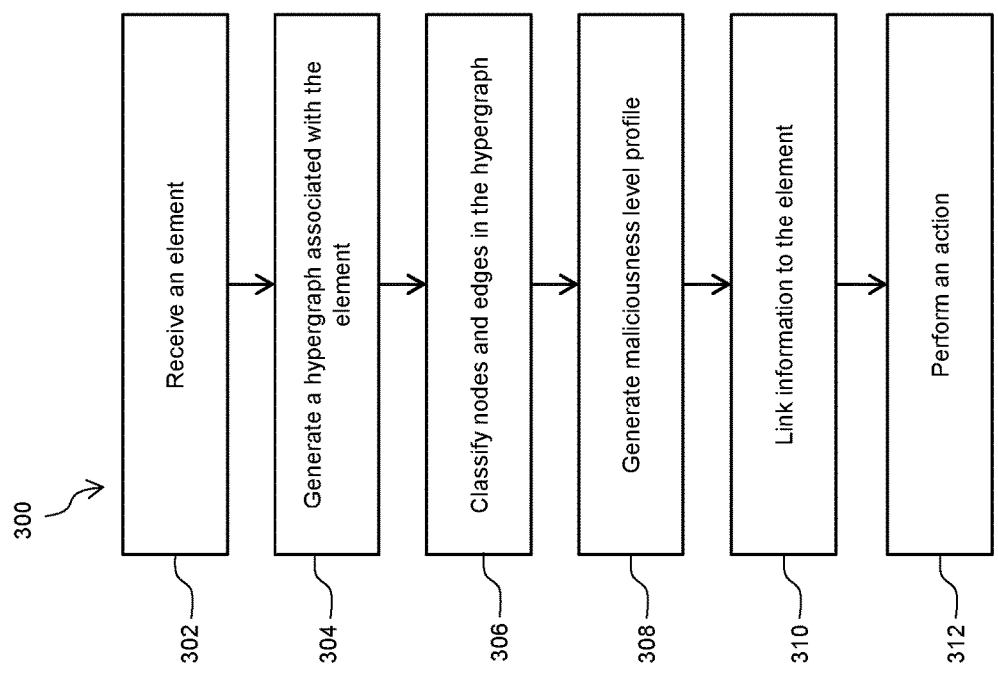
FIG. 3 is an example process that can be performed within the system of FIG. 1, according to some embodiments of the present disclosure.

FIG. 3 is an example process 300 that can be performed within the system of FIG. 1, according to some embodiments of the present disclosure. At block 302, the server 106 can receive an element, such as from one of the user devices 102. In some embodiments, this can be as a result of scanning the various user devices and obtaining an element based on some user-defined criteria. At block 304, the hypergraph module 108 generates a hypergraph associated with the element. In some embodiments, this can include performing a crawling procedure to generate a neighborhood for the element as described herein.

At block 306, the classification module 110 can classify the nodes and edges in the hypergraph. In some embodiments, the classification module 110 can feed the generated hypergraph into a graph neural network, such as the one described in FIG. 2. The output of the neural network would thus be a classification of the nodes and edges in the hypergraph. At block 308, the maliciousness module 112 can generate a maliciousness level profile for the received element and, at 310, link information to the element in the local database 114. At block 312, the maliciousness module 112 can determine and perform an appropriate action to take based on the element type and the classification of block 306.

Figure 4:
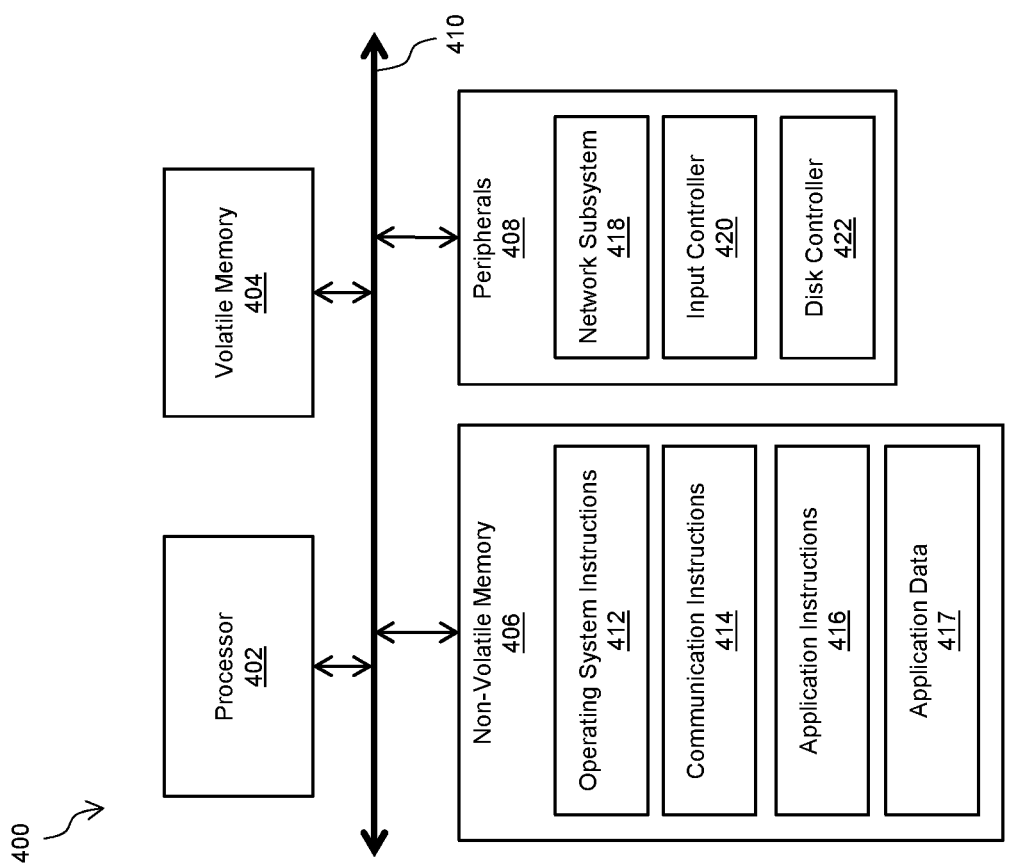
FIG. 4 is an example server device that can be used within the system of FIG. 1 according to an embodiment of the present disclosure.

FIG. 4 is a diagram of an example server device 400 that can be used within system 100 of FIG. 1. Server device 400 can implement various features and processes as described herein. Server device 400 can be implemented on any electronic device that runs software applications derived from complied instructions, including without limitation personal computers, servers, smart phones, media players, electronic tablets, game consoles, email devices, etc. In some implementations, server device 400 can include one or more processors 402, volatile memory 404, non-volatile memory 406, and one or more peripherals 408. These components can be interconnected by one or more computer buses 410.

Processor(s) 402 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 410 can be any known internal or external bus technology, including but not limited to ISA, EISA, PCI, PCI Express, USB, Serial ATA, or FireWire. Volatile memory 404 can include, for example, SDRAM. Processor 402 can receive instructions and data from a read-only memory or a random access memory or both. Essential elements of a computer can include a processor for executing instructions and one or more memories for storing instructions and data.

Non-volatile memory 406 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 can store various computer instructions including operating system instructions 412, communication instructions 414, application instructions 416, and application data 417. Operating system instructions 412 can include instructions for implementing an operating system (e.g., Mac OS®, Windows®, or Linux). The operating system can be multi-user, multiprocessing, multitasking, multithreading, real-time, and the like. Communication instructions 414 can include network communications instructions, for example, software for implementing communication protocols, such as TCP/IP, HTTP, Ethernet, telephony, etc. Application instructions 416 can include instructions for classifying elements using graph-based methods according to the systems and methods disclosed herein. For example, application instructions 416 can include instructions for components 108-114 described above in conjunction with FIG. 1. Application data 417 can include data corresponding to 108-114 described above in conjunction with FIG. 1.

Peripherals 408 can be included within server device 400 or operatively coupled to communicate with server device 400. Peripherals 408 can include, for example, network subsystem 418, input controller 420, and disk controller 422. Network subsystem 418 can include, for example, an Ethernet of WiFi adapter. Input controller 420 can be any known input device technology, including but not limited to a keyboard (including a virtual keyboard), mouse, track ball, and touch-sensitive pad or display. Disk controller 422 can include one or more mass storage devices for storing data files; such devices include magnetic disks, such as internal hard disks and removable disks; magneto-optical disks; and optical disks.

Figure 5:
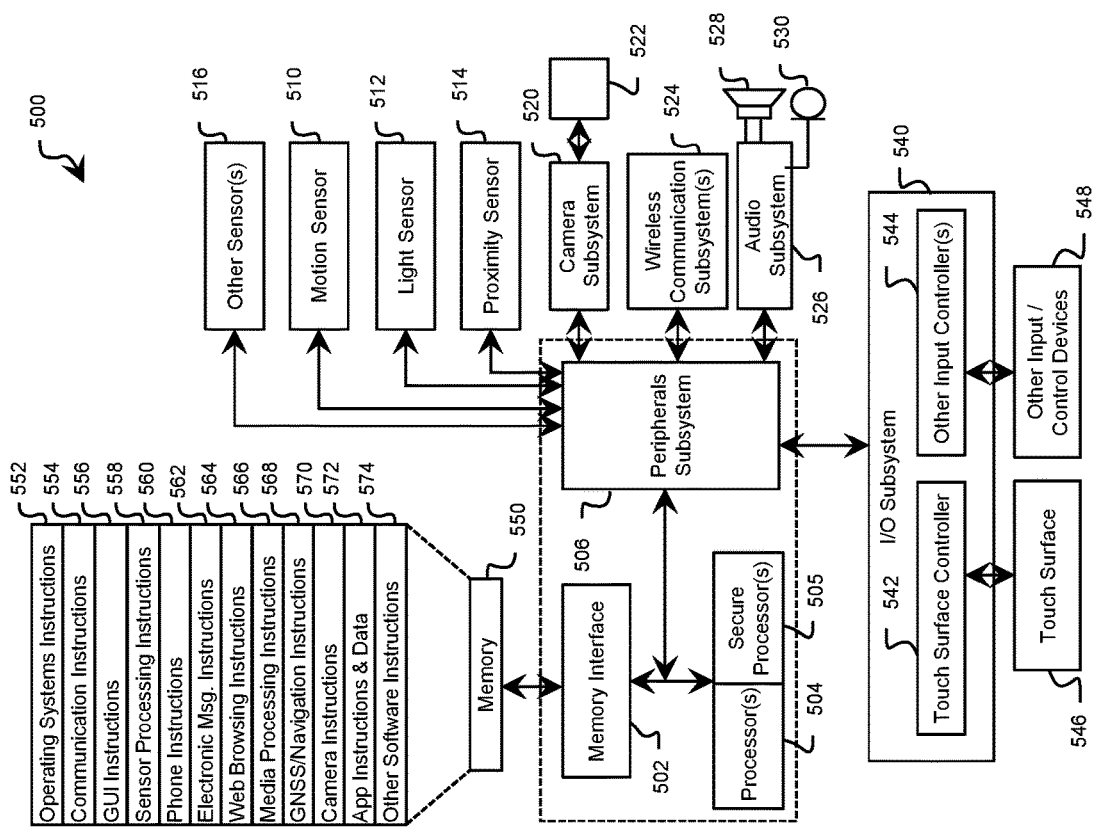
FIG. 5 is an example computing device that can be used within the system of FIG. 1 according to an embodiment of the present disclosure.

FIG. 5 is an example computing device that can be used within the system 100 of FIG. 1, according to an embodiment of the present disclosure. In some embodiments, device 500 can be any of user devices 102a-n. The illustrative user device 500 can include a memory interface 502, one or more data processors, image processors, central processing units 504, and/or secure processing units 505, and peripherals subsystem 506. Memory interface 502, one or more central processing units 504 and/or secure processing units 505, and/or peripherals subsystem 506 can be separate components or can be integrated in one or more integrated circuits. The various components in user device 500 can be coupled by one or more communication buses or signal lines.

Sensors, devices, and subsystems can be coupled to peripherals subsystem 506 to facilitate multiple functionalities. For example, motion sensor 510, light sensor 512, and proximity sensor 514 can be coupled to peripherals subsystem 506 to facilitate orientation, lighting, and proximity functions. Other sensors 516 can also be connected to peripherals subsystem 506, such as a global navigation satellite system (GNSS) (e.g., GPS receiver), a temperature sensor, a biometric sensor, magnetometer, or other sensing device, to facilitate related functionalities.

Camera subsystem 520 and optical sensor 522, e.g., a charged coupled device (CCD) or a complementary metal-oxide semiconductor (CMOS) optical sensor, can be utilized to facilitate camera functions, such as recording photographs and video clips. Camera subsystem 520 and optical sensor 522 can be used to collect images of a user to be used during authentication of a user, e.g., by performing facial recognition analysis.

Communication functions can be facilitated through one or more wired and/or wireless communication subsystems 524, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 524. The specific design and implementation of communication subsystems 524 can depend on the communication network(s) over which the user device 500 is intended to operate. For example, user device 500 can include communication subsystems 524 designed to operate over a GSM network, a GPRS network, an EDGE network, a WiFi or WiMax network, and a Bluetooth™ network. For example, wireless communication subsystems 524 can include hosting protocols such that device 500 can be configured as a base station for other wireless devices and/or to provide a WiFi service.

Audio subsystem 526 can be coupled to speaker 528 and microphone 530 to facilitate voice-enabled functions, such as speaker recognition, voice replication, digital recording, and telephony functions. Audio subsystem 526 can be configured to facilitate processing voice commands, voice-printing, and voice authentication, for example.

I/O subsystem 540 can include a touch-surface controller 542 and/or other input controller(s) 544. Touch-surface controller 542 can be coupled to a touch-surface 546. Touch-surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, a pressing of the button for a first duration can disengage a lock of touch-surface 546; and a pressing of the button for a second duration that is longer than the first duration can turn power to user device 500 on or off. Pressing the button for a third duration can activate a voice control, or voice command, module that enables the user to speak commands into microphone 530 to cause the device to execute the spoken command. The user can customize a functionality of one or more of the buttons. Touch-surface 546 can, for example, also be used to implement virtual or soft buttons and/or a keyboard.

In some implementations, user device 500 can present recorded audio and/or video files, such as MP3, AAC, and MPEG files. In some implementations, user device 500 can include the functionality of an MP3 player, such as an iPod™. User device 500 can, therefore, include a 36-pin connector and/or 8-pin connector that is compatible with the iPod. Other input/output and control devices can also be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store an operating system 552, such as Darwin, RTXC, LINUX, UNIX, OS X, Windows, or an embedded operating system such as VxWorks.

Operating system 552 can include instructions for handling basic system services and for performing hardware dependent tasks. In some implementations, operating system 552 can be a kernel (e.g., UNIX kernel). In some implementations, operating system 552 can include instructions for performing voice authentication.

Memory 550 can also store communication instructions 554 to facilitate communicating with one or more additional devices, one or more computers and/or one or more servers.

Memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic messaging-related process and functions; web browsing instructions 564 to facilitate web browsing-related processes and functions; media processing instructions 566 to facilitate media processing-related functions and processes; GNSS/Navigation instructions 568 to facilitate GNSS and navigation-related processes and instructions; and/or camera instructions 570 to facilitate camera-related processes and functions.

Memory 550 can store application (or "app") instructions and data 572, such as instructions for the apps described above in the context of FIGS. 1-3. Memory 550 can also store other software instructions 574 for various other software applications in place on device 500.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method of determining a maliciousness level of an element using a hypergraph of neighbors comprising:
    scanning a computing device to identify an element with a maliciousness level that is at least partly undetermined;

generating, for the identified element, a hypergraph of neighbor target elements found in a data source, the hypergraph comprising a set of nodes and a set of edges, wherein the set of nodes represents the neighbor target elements, and the set of edges represents connections between the neighbor target elements;

providing the hypergraph as an input to a classifier;

classifying, using the classifier, nodes and edges in the hypergraph;

generating a maliciousness level profile for the element based on aggregation of nodes and edges in the hypergraph; and performing an action based on the maliciousness level profile.

2. The method of claim 1, wherein the data source comprises an endpoint.

3. The method of claim 1, wherein the hypergraph comprises a single source node for each of the set of edges.

4. The method of claim 1, wherein the hypergraph comprises at least one node with one or more edges.

5. The method of claim 1, wherein the hypergraph is a hybrid hypergraph comprising combined data collected from the data source and data from one or more external databases.

6. The method of claim 1, wherein sets of neighborhoods of target nodes are generated iteratively based on nodes satisfying particular features.

7. The method of claim 1, wherein generating the hypergraph comprises acquiring the neighbor target elements using a crawling procedure.

8. The method of claim 1, wherein an element is classified based on its connections to neighbors without a classification of at least one of the neighbors.

9. The method of claim 1, wherein the classifier comprises a graph neural network.

10. The method of claim 1, wherein the action comprises at least one of:
if the element comprises a file:
isolating a machine that received the file;
killing at least one process started by the file;
removing persistence of the file on at least one of a network or affected computer;
cleaning at least one infected sample;
modifying a risk assessment for at least of the network or affected computer;
generating a report;
collecting additional artifacts;
triggering a search for related elements;
blocking a user from taking actions; or
sending information to at least one other security system; or
blocking an IP address or a web domain from network access;
restricting at least one user authorization;
blocking access to an external device;
shutting down at least one computer;
erasing at least one memory device; or
filtering at least one electronic mail message.

11. A method of classifying an element comprising:
generating a hypergraph of nodes, edges, and neighboring elements by crawling;
iteratively generating sets of neighborhoods of the element from the hypergraph;
determining a maliciousness level for the element by analyzing the sets of neighborhoods with a trained neural network, wherein each layer of the neural network includes processing steps:
aggregating information from immediate neighbors of each node and using the information to calculate additional features for said node;
feeding a plurality of features into a neural layer, one for each node kind; and
generating a maliciousness level profile for the element;
linking information relating to the element and the maliciousness level profile for the element; and
performing an action based on a type of the element.

12. The method of claim 11, wherein the nodes are typed, and nodes of different types comprise different features.

13. The method of claim 11, wherein the hypergraph comprises a single source node for each edge.

14. The method of claim 11, wherein each edge is mapped to a set of target nodes.

15. The method of claim 11, further comprising utilizing an aggregation function, wherein the aggregation function is configured to determine most extreme evidence from features of the neighbors.

16. The method of claim 11, wherein the additional features are fed into a fully connected neural layer, and then a maximum over all the neighbors is selected.

17. The method of claim 11, wherein the neural network is trained by:
providing a set of seed nodes;
crawling for a set of the seed nodes' neighborhoods;
building a subgraph from the set of the seed nodes' neighborhoods; and
training the neural network by feeding the subgraph to the neural network.

18. The method of claim 11, wherein the action comprises at least one of:
if the element comprises a file:
isolating a machine that received the file;
killing at least one process started by the file;
removing persistence of the file on at least one of a network or affected computer;
cleaning at least one infected sample;
modifying a risk assessment for at least of the network or affected computer;
generating a report;
collecting additional artifacts;
triggering a search for related elements;
blocking a user from taking actions; or
sending information to at least one other security system; or
blocking an IP address or a web domain from network access;
restricting at least one user authorization;
blocking access to an external device;
shutting down at least one computer;
erasing at least one memory device; or
filtering at least one electronic mail message.

19. A computing system for determining a maliciousness level of an element comprising one or more processors and one or more non-transitory computer-readable media, the media storing:
a neural network trained to:
receive a hypergraph as an input; and
classify a node of the hypergraph; and
instructions that, when executed by the one or more processors, cause the computing system to perform operations, the operations comprising:
scanning an external computing device to identify elements of an unknown maliciousness level;

generating an element hypergraph associated with the unknown element;

processing the element hypergraph with the neural network to generate a maliciousness classification; and performing an action based on the maliciousness classification.

20. The computing system of claim 19, wherein the neural network is a graph convolutional neural network and comprises one or more layers, each layer comprising an aggregation layer and a fully-connected layer, wherein the fully-connected layer processes the element hypergraph and an output from the aggregation layer.

\* \* \* \* \*